(12) United States Patent
Wichelt et al.

(10) Patent No.: US 11,820,448 B2
(45) Date of Patent: Nov. 21, 2023

(54) INFINITE STEERING MODE

(71) Applicant: STEERING SOLUTIONS IP HOLDING CORPORATION, Saginaw, MI (US)

(72) Inventors: Deane M. Wichelt, Bay City, MI (US); Andrew P. Ritchie, Fenton, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 644 days.

(21) Appl. No.: 17/061,356

(22) Filed: Oct. 1, 2020

(65) Prior Publication Data
US 2022/0105981 A1 Apr. 7, 2022

(51) Int. Cl.
*B62D 6/00* (2006.01)

(52) U.S. Cl.
CPC ..................... *B62D 6/00* (2013.01)

(58) Field of Classification Search
CPC .......................................... B62D 6/00
See application file for complete search history.

*Primary Examiner* — Mathew Franklin Gordon
(74) *Attorney, Agent, or Firm* — Dickinson Wright PLLC

(57) ABSTRACT

A method for providing steering mode control includes identifying a set of steering characteristic values corresponding to respective steering characteristics for a current steering mode. The method also includes setting the respective steering characteristics to corresponding steering characteristic values of the set of steering characteristic values and receiving at least one steering characteristics input indicating a selected steering characteristic value for a corresponding steering characteristic. The method also includes selectively setting the steering characteristic value of the corresponding steering characteristic to the selected steering characteristic value indicated by the at least one steering characteristics input.

20 Claims, 5 Drawing Sheets

US 11,820,448 B2

INFINITE STEERING MODE

TECHNICAL FIELD

This disclosure relates to steering systems and in particular to systems and methods for providing infinite steering modes for a steering system.

BACKGROUND OF THE INVENTION

A vehicle, such as a car, truck, sport utility vehicle, crossover, mini-van, marine craft, aircraft, all-terrain vehicle, recreational vehicle, or other suitable forms of transportation, typically includes a steering system, such as an electronic power steering (EPS) system or other suitable steering system. The steering system of such a vehicle typically controls various aspects of vehicle steering including providing steering assist to an operator of the vehicle, controlling steerable wheels of the vehicle, and the like.

Typically, such steering systems may be tunable to provide a particular steering feel or perception to the operator of the vehicle. For example, a steering system in a sport or performance vehicle may be tuned to have a relatively firm or tight feel or perception by the operator of the vehicle, while a steering system of a touring vehicle may be tuned to have a relatively soft or loose feel or perception of the operator of the vehicle. Increasingly, vehicles may be provided with a selectable steering mode for an associated steering system. For example, the operator of the vehicle may be provided with a selection interface, such as an actuatable switch or virtual interface, that allows the operator to select between two or more steering modes. Typically, such steering modes include a normal steering mode, a sport steering mode, a comfort steering mode, and the like.

SUMMARY OF THE INVENTION

This disclosure relates generally to steering systems.

An aspect of the disclosed embodiments includes a method for providing steering mode control. The method includes determining a current steering mode selection based on a steering mode input and identifying a set of steering characteristic values corresponding to respective steering characteristics for the current steering mode. The method also includes setting the respective steering characteristics to corresponding steering characteristic values of the set of steering characteristic values and receiving at least one steering characteristics input indicating a selected steering characteristic value for a corresponding steering characteristic. The method also includes selectively setting the steering characteristic value of the corresponding steering characteristic to the selected steering characteristic value indicated by the at least one steering characteristics input.

Another aspect of the disclosed embodiments includes a system for providing steering mode control. The system includes a processor and a memory. The memory includes instructions that, when executed by the processor, cause the processor to: determine a current steering mode selection based on a steering mode input; identify a set of steering characteristic values corresponding to respective steering characteristics for the current steering mode; set the respective steering characteristics to corresponding steering characteristic values of the set of steering characteristic values; receive at least one steering characteristics input indicating a selected steering characteristic value for a corresponding steering characteristic; and selectively set the steering characteristic value of the corresponding steering characteristic to the selected steering characteristic value indicated by the at least one steering characteristics input.

Another aspect of the disclosed embodiments includes an apparatus for providing steering mode control. The apparatus includes a processor and a memory. The memory includes instructions that, when executed by the processor, cause the processor to: receive an assist steering characteristics input indicating a selected assist steering characteristic value; receive a damping steering characteristics input indicating a selected damping steering characteristic value; receive a return steering characteristics input indicating a selected return steering characteristic value; receive a road feedback steering characteristics input indicating a selected road feedback steering characteristic value; selectively set a set of steering characteristics using the selected assist steering characteristic value, the selected damping steering characteristic value, the selected return steering characteristic value, and the selected road feedback steering characteristic value; and generate a blended steering mode using the set of steering characteristics.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
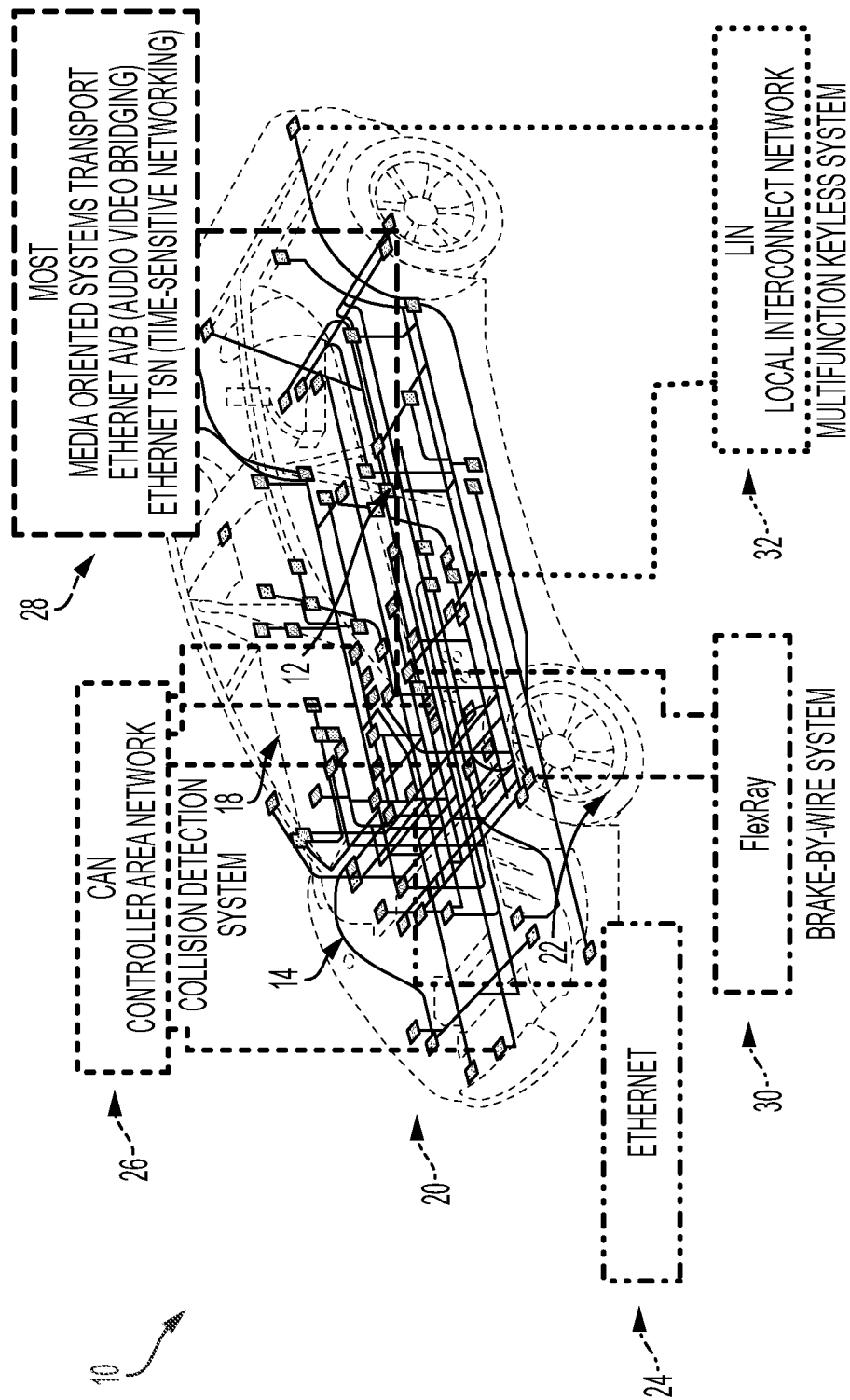
FIG. 1 generally illustrates a vehicle according to the principles of the present disclosure.

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, a vehicle, such as a car, truck, sport utility vehicle, crossover, mini-van, marine craft, aircraft, all-terrain vehicle, recreational vehicle, or other suitable vehicles, typically includes a steering system, such as an electronic power steering (EPS) system or other suitable steering system. The steering system of such a vehicle typically controls various aspects of vehicle steering including providing steering assist to an operator of the vehicle, controlling steerable wheels of the vehicle, and the like.

Typically, such steering systems may be tunable to provide a particular steering feel or perception to the operator of the vehicle. For example, a steering system in a sport or performance vehicle may be tuned to have a relatively firm or tight feel or perception by the operator of the vehicle, while a steering system of a touring vehicle may be tuned to have a relatively soft or loose feel or perception of the operator of the vehicle. Increasingly, vehicles may be provided with a selectable steering mode for an associated steering system. For example, the operator of the vehicle may be provided with a selection interface, such as an actuatable switch or virtual interface that allows the operator to select between two or more steering modes. Typically, such steering modes include a normal steering mode, a sport steering mode, a comfort steering mode, and the like. For example, a sport steering mode may feature a heavier steering feel than a normal steering mode and a comfort steering mode may feature a lighter steering feel than the normal steering mode.

Such steering modes are typically independently tuned using various steering characteristics. For example, each steering mode may comprise several steering characteristics tuned to values corresponding to the desired steering feel or perception by the operator of the corresponding steering mode. The steering characteristics may include an assist steering characteristic, a damping steering characteristic, a road feedback steering characteristic, a return steering characteristic, other suitable steering characteristics, or a combination thereof. However, such typical selectable steering mode features may limit the operator to rigid, predefined steering modes, which may not allow for a desirable selection by the operator. For example, a sport steering mode may had a heavier feel than desired by the operator and a normal steering mode may have a lighter feel then desired by the operator.

Accordingly, systems and methods, such as those described herein, that may be configured to allow an operator to select a desirable steering mode, may be desirable. In some embodiments, the systems and method described herein may be configured to provide personalization features to steering mode selection of a vehicle. In some embodiments, the systems and methods described herein may be configured to provide one or more virtual sliders on an infotainment system of the vehicle. The one or more virtual sliders may allow the operator to selectively adjust tuning functions (e.g., the steering characteristics) of the vehicle.

In some embodiments, the systems and methods described herein may be configured to blend between a sport steering mode, a normal steering mode, a comfort steering mode, and any other suitable steering mode. In some embodiments, the systems and methods described herein may be configured to set or provide one or more steering mode limits (e.g., such as the normal steering mode, the sport steering mode, the comfort steering mode, or other suitable steering mode selectively tuned during manufacturing and/or assembly of the vehicle). The systems and methods described herein may be configured to allow the operator to select any suitable steering mode between each of the steering mode limits (e.g., by blending steering characteristics between the steering mode limits).

In some embodiments, the systems and methods described herein may be configured to allow the operator to blend between the predefined steering modes by adjusting the virtual sliders (e.g., corresponding to the assist steering characteristic, the damping steering characteristic, the return steering characteristic, the road feedback steering characteristics, and/or any other suitable steering characteristic) or using any suitable interface configured to allow the operator to adjust the steering characteristics (e.g., a mechanical interface, such as a switch or other suitable interface). The systems and methods described herein may be configured to allow the operator to adjust steering feel of the vehicle to a desired steering feel preference by adjusting the steering characteristics.

In some embodiments, the systems and methods described herein may be configured to determine a current steering mode selection based on a steering mode input. The systems and methods described herein may be configured to identify a set of steering characteristic values corresponding to respective steering characteristics for the current steering mode. In some embodiments, the at least one steering characteristics input corresponds to a virtual control mechanism corresponding to the corresponding steering characteristic. In some embodiments, the corresponding steering characteristic includes an assist steering characteristic. In some embodiments, the corresponding steering characteristic includes a damping steering characteristic. In some embodiments, the corresponding steering characteristic includes a return steering characteristic. In some embodiments, the corresponding steering characteristic includes a road feedback steering characteristic.

The systems and methods described herein may be configured to set the respective steering characteristics to corresponding steering characteristic values of the set of steering characteristic values. The systems and methods described herein may be configured to receive at least one steering characteristics input indicating a selected steering characteristic value for a corresponding steering characteristic. The systems and methods described herein may be configured to selectively set the steering characteristic value of the corresponding steering characteristic to the selected steering characteristic value indicated by the at least one steering characteristics input.

In some embodiments, the systems and methods described herein may be configured to generate a blended steering mode using the selected steering characteristic value indicated by the at least one steering characteristics input. In some embodiments, the blended steering mode corresponds to a steering mode having steering characteristic values set between steering characteristic values of a first steering mode set point and steering characteristic values of a second steering mode set point.

In some embodiments, the systems and methods described herein may be configured to receive an assist steering characteristics input indicating a selected assist steering characteristic value. In some embodiments, an operator provides the assist steering characteristics input, the damping steering characteristics input, the return steering characteristics input, and the road feedback steering characteristics input using a virtual input mechanism provided on a display in communication with a steering system, such as an electronic power steering system (EPS) or other suitable steering system, configured to operate according to the blended steering mode. In some embodiments, the display includes a vehicle infotainment interface.

The systems and methods described herein may be configured to receive a damping steering characteristics input indicating a selected damping steering characteristic value. The systems and methods described herein may be configured to receive a return steering characteristics input indicating a selected return steering characteristic value. The systems and methods described herein may be configured to receive a road feedback steering characteristics input indicating a selected road feedback steering characteristic value.

The systems and methods described herein may be configured to selectively set a set of steering characteristics using the selected assist steering characteristic value, the selected damping steering characteristic value, the selected return steering characteristic value, and the selected road feedback steering characteristic value. The systems and methods described herein may be configured to generate a blended steering mode using the set of steering characteristics. In some embodiments, the blended steering mode corresponds to a steering mode having steering characteristic values set between steering characteristic values of a first steering mode set point and steering characteristic values of a second steering mode set point.

FIG. 1 generally illustrates a vehicle 10 according to the principles of the present disclosure. The vehicle 10 may include any suitable vehicle, such as a car, a truck, a sport utility vehicle, a mini-van, a crossover, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles The vehicle 10 includes a vehicle body 12 and a hood 14. A passenger compartment 18 is at least partially defined by the vehicle body 12. Another portion of the vehicle body 12 defines an engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position. In some embodiments, the engine compartment 20 may be disposed on rearward portion of the vehicle 10 than is generally illustrated.

The passenger compartment 18 may be disposed rearward of the engine compartment 20, but may be disposed forward of the engine compartment 20 in embodiments where the engine compartment 20 is disposed on the rearward portion of the vehicle 10. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system.

In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a steering wheel, and other such components are disposed in the passenger compartment 18 of the vehicle 10. The propulsion controls may be actuated or controlled by a driver of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system. As such, in some embodiments, the vehicle 10 may be an autonomous vehicle.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force, which is translated through the transmission to one or more axles, which turns wheels 22. When the vehicle 10 includes one or more electric motors, a vehicle battery, and/or fuel cell provides energy to the electric motors to turn the wheels 22.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semi-autonomous vehicle, or other suitable type of vehicle. The vehicle 10 may include additional or fewer features than those generally illustrated and/or disclosed herein.

In some embodiments, the vehicle 10 may include an Ethernet component 24, a controller area network (CAN) bus 26, a media oriented systems transport component (MOST) 28, a FlexRay component 30 (e.g., brake-by-wire system, and the like), and a local interconnect network component (LIN) 32. The vehicle 10 may use the CAN bus 26, the MOST 28, the FlexRay Component 30, the LIN 32, other suitable networks or communication systems, or a combination thereof to communicate various information from, for example, sensors within or external to the vehicle, to, for example, various processors or controllers within or external to the vehicle. The vehicle 10 may include additional or fewer features than those generally illustrated and/or disclosed herein.

The vehicle 10 may include a steering system, such as an electronic power steering system (EPS) or other suitable steering system. The steering system may be configure to provide steering assist to the operator of the vehicle 10, control various aspects of the vehicle 10, and/or perform other functions within the vehicle 10. The vehicle 10 may include a mechanism for selecting one of a plurality of predefined steering modes. For example, the vehicle 10 may include a virtual switching mechanism, a mechanical switching mechanism, or other suitable mechanism configured to allow the operator of the vehicle 10 to select one of the plurality of predefined steering modes. The predefined steering modes may include a sport steering mode, a normal steering mode, a comfort steering mode, other suitable steering mode, or a combination thereof.

Each steering mode is defined by a set of steering characteristics. For example, each of the predefined steering modes may be defined by an assist steering characteristic value, a damping steering characteristic value, a return steering characteristic value, a road feedback steering characteristic value, any other suitable starring characteristic value, or a combination thereof. Additionally, or alternatively, a first steering model may be defined by a first assist steering characteristic value, a first damping steering characteristic value, a first return steering characteristic value, and a first road feedback steering characteristic value and a second steering mode may be defined by a second assist steering characteristic value, a second damping steering characteristic value, a second return steering characteristic value, and a second road feedback steering characteristic value. It should be understood that each of the predefined steering modes may have some similar steering characteristic values and/or some different steering characteristic values.

Figure 2:
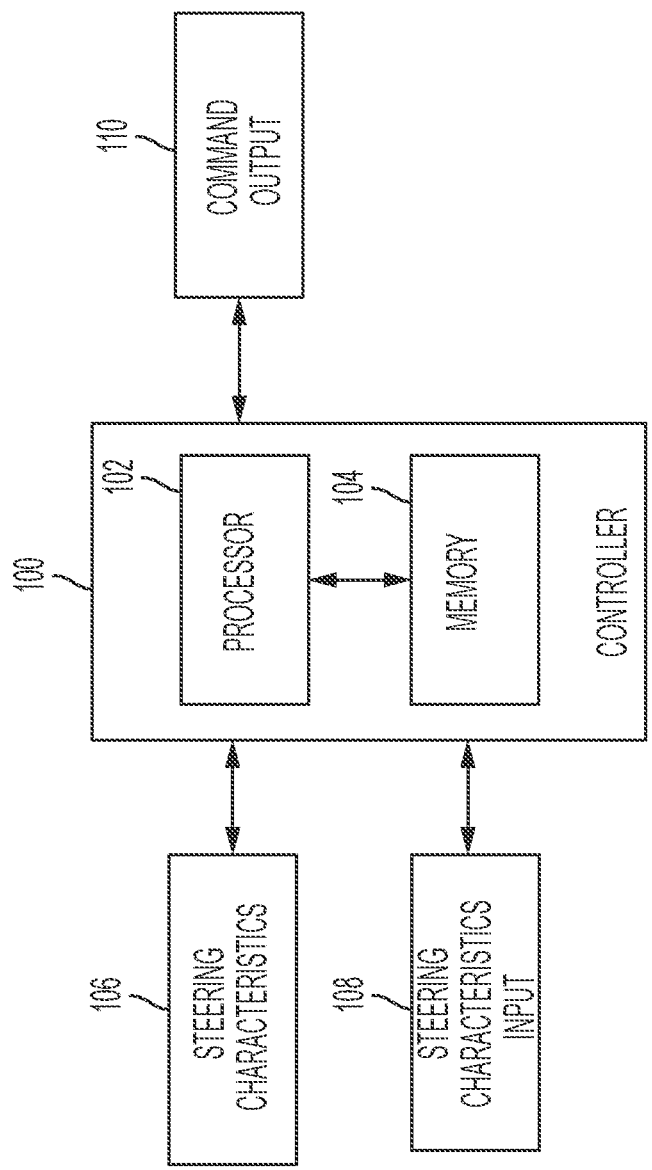
FIGS. 2-4 generally illustrate a steering mode control system according to the principles of the present disclosure.

The steering system of the vehicle 10 may be configured to provide a steering feel or perception to the operator according to the steering characteristics of the selected steering mode. For example, the vehicle 10 may include a controller, such as the controller 100 as is generally illustrated in FIG. 2. The controller 100 may include any suitable controller. Additionally, or alternatively, the vehicle 10 may include any suitable number of controllers in addition to and/or instead of the controller 100. The controller 100 may be configured to control, for example, various aspects of the steering system of vehicle 10 and/or other suitable functions of the vehicle 10. For example, the controller 100 may be configured to control steering characteristics of the steering system based on the selected predefined steering mode.

The controller 100 may include a processor 102 and a memory 104. The processor 102 may include any suitable processor, such as those described herein. Additionally, or alternatively, the controller 100 may include any suitable number of processors, in addition to or other than the processor 102. The memory 104 may comprise a single disk or a plurality of disks (e.g., hard drives), and includes a storage management module that manages one or more partitions within the memory 104. In some embodiments, memory 104 may include flash memory, semiconductor (solid state) memory or the like. The memory 104 may include Random Access Memory (RAM), a Read-Only Memory (ROM), or a combination thereof. The memory 104 may include instructions that, when executed by the processor 102, cause the processor 102 to, at least, control various steering system functions of the vehicle 10.

In some embodiments, the controller 100 may be configured to allow the operator to adjust the steering characteristics of the steering system to achieve any suitable steering mode. For example, the controller 100 may determine a current steering mode selection based on a steering mode input. The steering mode input may include an input received from the mechanism within the vehicle 10 configured to select one of the predefined steering modes. Additionally, or alternatively, the steering mode input may include a signal indicating a current steering mode of the steering system. The current steering mode may include one of the predefined steering modes or a steering mode between one of the predefined steering modes (e.g., previously set by the operator).

The controller 100 may identify a set of steering characteristic values corresponding to respective steering characteristics for the current steering mode. For example, the controller 100 may access a database or other suitable data repository, such as the steering characteristics repository 106. The steering characteristics repository 106 may be stored in any suitable location, including the memory 104 or other suitable location. The controller 100 may retrieve from the steering characteristics repository 106 a set of steering characteristic values corresponding to the current steering mode of the vehicle 10. The steering characteristic values may include an assist steering characteristic value, a damping steering characteristic value, a return steering characteristic value, a road feedback steering characteristic value, other suitable steering characteristic value, or a combination thereof. The set of steering characteristic values may be predefined (e.g., corresponding to one of the predefined steering modes) or defined by the operator and stored in the steering characteristics repository 106.

In some embodiments, the at least one steering characteristics input corresponds to a virtual control mechanism corresponding to the corresponding steering characteristic. In some embodiments, the corresponding steering characteristic includes an assist steering characteristic. In some embodiments, the corresponding steering characteristic includes a damping steering characteristic. In some embodiments, the corresponding steering characteristic includes a return steering characteristic. In some embodiments, the corresponding steering characteristic includes a road feedback steering characteristic.

The controller 100 may set the respective steering characteristics to corresponding steering characteristic values of the set of steering characteristic values. The controller 100 may selectively control aspects of the steering system based on the steering characteristic values.

In some embodiments, the controller 100 may receive at least one characteristics input indicating a selected steering characteristic value for a corresponding steering characteristic. For example, as described, the vehicle 10 may include an infotainment system comprising a display and/or digital or virtual interface. The infotainment system may provide various information, functions, and/or controls to the operator of the vehicle 10. The infotainment system may include one or more virtual sliders corresponding to respective ones of the steering characteristics. For example, the virtual sliders may include an assist slider, a damping slider, a return slider, a road feedback slider, other suitable slider, or a combination thereof. The operator may adjust the sliders (e.g., by actuating the virtual slide up, down, to a first side, to a second side, in a circular motion, or other suitable adjustment) to increase or decrease a corresponding steering characteristic value.

The virtual sliders and/or a controller or processor associated with the infotainment system may generate a steering characteristics input 108. The steering characteristics input 108 may include a signal, a file, or other suitable input. The steering characteristics input 108 may indicate one or more steering characteristic values associated with corresponding steering characteristics. It should be understood that while only virtual sliders disposed or provided on an infotainment system are described, the steering characteristics input 108 may be generated by any suitable mechanism including another virtual control, a mechanical control (e.g., a switch or other suitable mechanical control), or other suitable control mechanism.

The controller 100 may selectively set steering characteristic values of corresponding steering characteristics to the steering characteristic values indicated by the steering characteristics input 108. For example, the controller 100 may set an assist steering characteristic value of an assist steering characteristic of the vehicle 10 to an assist steering characteristic value selected by the operator and indicated by the steering characteristics input 108.

Figure 3:
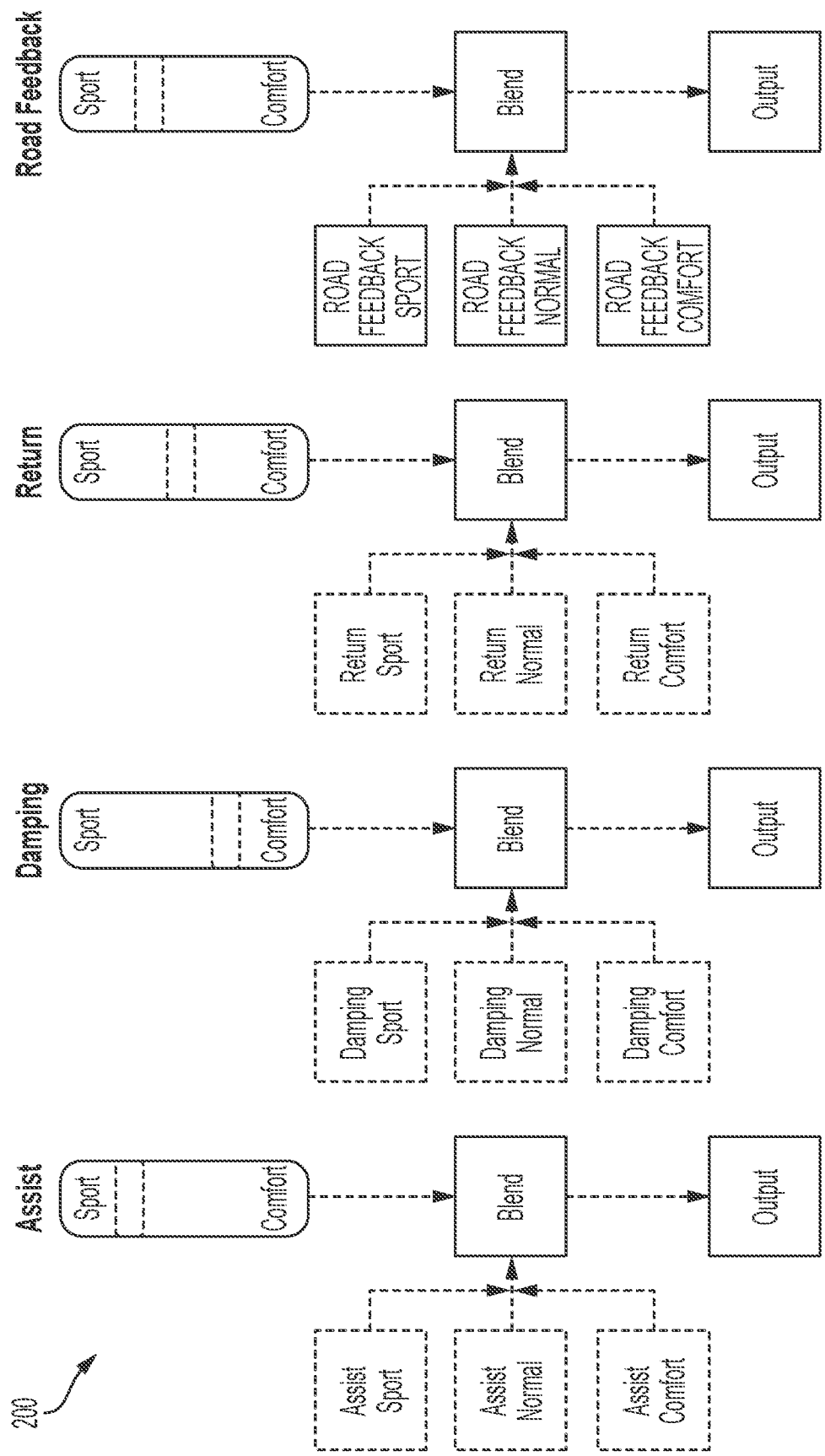
Figure 4:
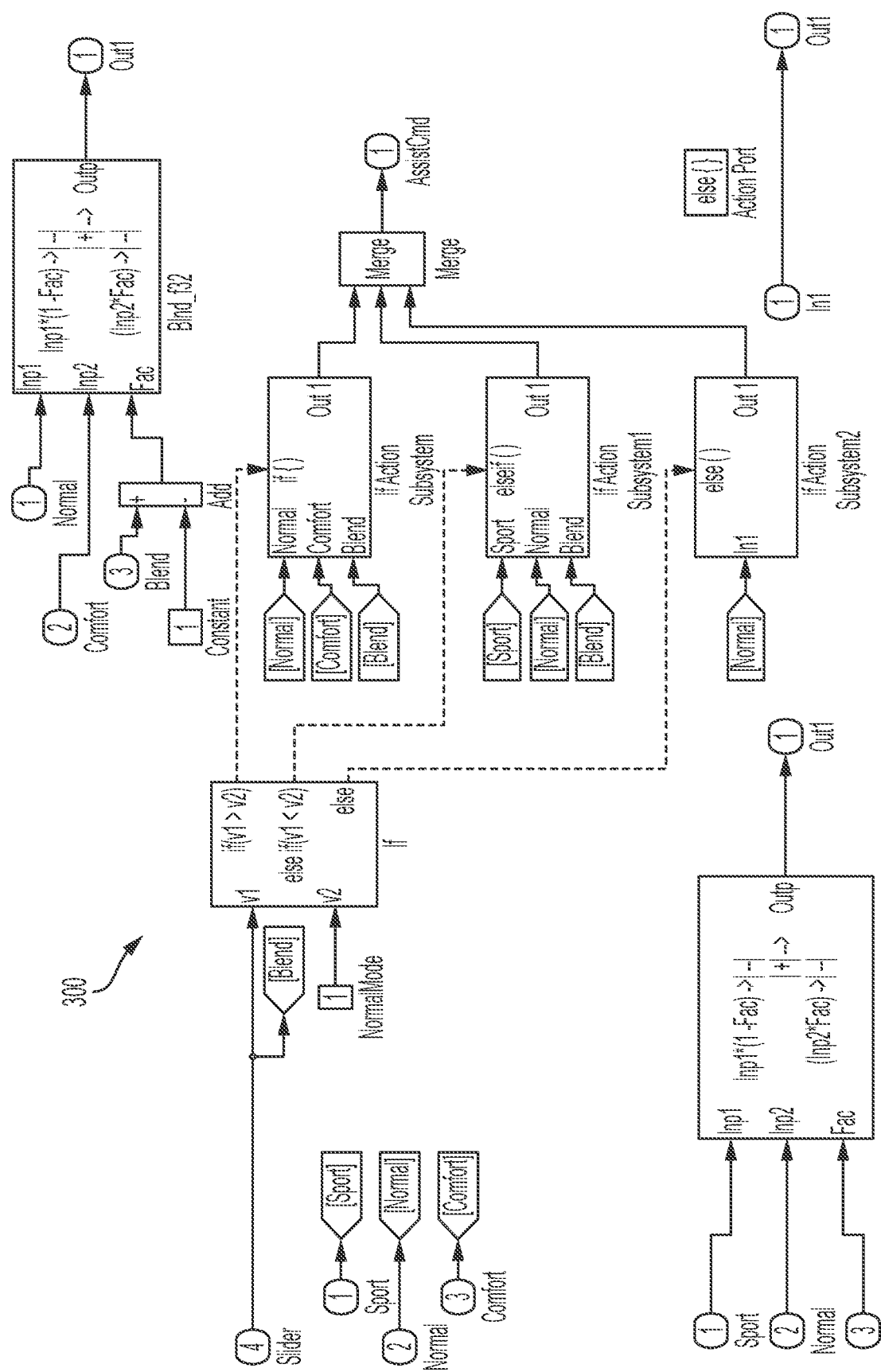

As is generally illustrated in FIGS. 3 and 4, the controller 100 may be configured to generate a blended steering mode using the selected steering characteristic value indicated by the steering characteristics input 108. The blended steering mode corresponds to a steering mode having steering characteristic values set between steering characteristic values of a first steering mode set point and steering characteristic values of a second steering mode set point.

As is generally illustrated in FIG. 3, the controller 100 may receive an assist steering characteristics input indicating a selected assist steering characteristic value. The controller 100 receive a damping steering characteristics input indicating a selected damping steering characteristic value. The controller 100 may receive a return steering characteristics input indicating a selected return steering characteristic value. The controller 100 may receive a road feedback steering characteristics input indicating a selected road feedback steering characteristic value. The operator may provide the assist steering characteristics input, the damping steering characteristics input, the return steering characteristics input, and the road feedback steering characteristics input using the virtual sliders or other suitable mechanism.

The controller 100 may selectively set the steering characteristics of the steering system using the selected assist steering characteristic value, the selected damping steering characteristic value, the selected return steering characteristic value, and the selected road feedback steering characteristic value. The controller 100 may generate a blended steering mode using the set of steering characteristics. The blended steering mode may include a steering mode between two of the predefined steering modes (e.g., which may be referred to as steering mode set points). For example, the blended steering mode may include a steering mode between the sport steering mode and the normal steering mode.

In some embodiments, the controller 100 may perform the methods described herein. However, the methods described herein as performed by the controller 100 are not meant to be limiting, and any type of software executed on a controller or processor can perform the methods described herein without departing from the scope of this disclosure. For example, a controller, such as a processor executing software within a computing device, can perform the methods described herein.

Figure 5:
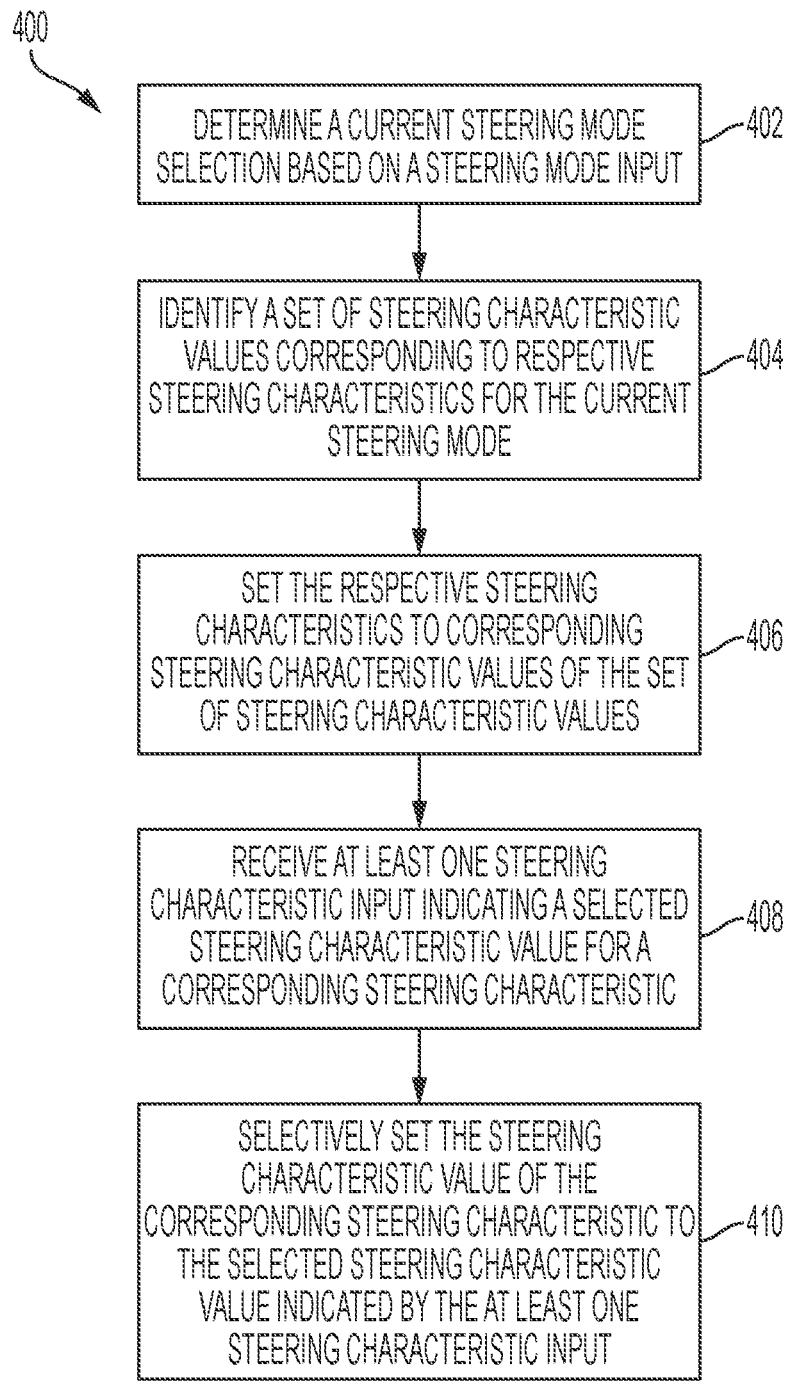
FIG. 5 is a flow diagram generally illustrating a steering mode control method according to the principles of the present disclosure.

FIG. 5 is a flow diagram generally illustrating a steering mode control method 400 according to the principles of the present disclosure. At 402, the method 400 determines a current steering mode selection based on a steering mode input. For example, the controller 100 determines the current steering mode of the steering system of the vehicle 10.

At 404, the method 400 identifies a set of steering characteristic values corresponding to respective steering characteristics for the current steering mode. For example, the controller 100 may identify the set of steering characteristics in the steering characteristics repository 106 corresponding to the current steering mode.

At 406, the method 400 sets the respective steering characteristics to corresponding steering characteristic values of the set of steering characteristic values. For example, the controller 100 may set respective steering characteristics of the steering system to corresponding steering characteristic values of the set of steering characteristic values.

At 408, the method 400 receives at least one steering characteristics input indicating a selected steering characteristic value for a corresponding steering characteristic. For example, the controller 100 may receive the steering characteristics input 108 indicating one or more steering characteristic values corresponding to respective ones of the steering characteristic of the steering system.

At 410, the method 400 sets the steering characteristic value of the corresponding steering characteristic to the selected steering characteristic value indicated by the at least one steering characteristics input. For example, the controller 100 may set the steering characteristic value of corresponding steering characteristics of the steering system to the selected steering characteristic values indicated by the steering characteristics input 108. The controller 100 may selectively control aspects of the steering system based on the steering characteristics and/or a corresponding blended steering mode to achieve the desired steering feel indicated and/or selected by the operator of the vehicle 10.

In some embodiments, a method for providing steering mode control includes determining a current steering mode selection based on a steering mode input and identifying a set of steering characteristic values corresponding to respective steering characteristics for the current steering mode. The method also includes setting the respective steering characteristics to corresponding steering characteristic values of the set of steering characteristic values and receiving at least one steering characteristics input indicating a selected steering characteristic value for a corresponding steering characteristic. The method also includes selectively setting the steering characteristic value of the corresponding steering characteristic to the selected steering characteristic value indicated by the at least one steering characteristics input.

In some embodiments, the at least one steering characteristics input corresponds to a virtual control mechanism corresponding to the corresponding steering characteristic. In some embodiments, the corresponding steering characteristic includes an assist steering characteristic. In some embodiments, the corresponding steering characteristic includes a damping steering characteristic. In some embodiments, the corresponding steering characteristic includes a return steering characteristic. In some embodiments, the corresponding steering characteristic includes a road feedback steering characteristic. In some embodiments, the method also includes generating a blended steering mode using the selected steering characteristic value indicated by the at least one steering characteristics input. In some embodiments, the blended steering mode corresponds to a steering mode having steering characteristic values set between steering characteristic values of a first steering mode set point and steering characteristic values of a second steering mode set point.

In some embodiments, a system for providing steering mode control includes a processor and a memory. The memory includes instructions that, when executed by the processor, cause the processor to: determine a current steering mode selection based on a steering mode input; identify a set of steering characteristic values corresponding to respective steering characteristics for the current steering mode; set the respective steering characteristics to corresponding steering characteristic values of the set of steering characteristic values; receive at least one steering characteristics input indicating a selected steering characteristic value for a corresponding steering characteristic; and selectively set the steering characteristic value of the corresponding steering characteristic to the selected steering characteristic value indicated by the at least one steering characteristics input.

In some embodiments, the at least one steering characteristics input corresponds to a virtual control mechanism corresponding to the corresponding steering characteristic. In some embodiments, the corresponding steering characteristic includes an assist steering characteristic. In some embodiments, the corresponding steering characteristic includes a damping steering characteristic. In some embodiments, the corresponding steering characteristic includes a return steering characteristic. In some embodiments, the corresponding steering characteristic includes a road feedback steering characteristic. In some embodiments, the instructions further cause the processor to generate a blended steering mode using the selected steering characteristic value indicated by the at least one steering characteristics input. In some embodiments, the blended steering mode corresponds to a steering mode having steering characteristic values set between steering characteristic values of a first steering mode set point and steering characteristic values of a second steering mode set point.

In some embodiments, an apparatus for providing steering mode control includes a processor and a memory. The memory includes instructions that, when executed by the processor, cause the processor to: receive an assist steering characteristics input indicating a selected assist steering characteristic value; receive a damping steering characteristics input indicating a selected damping steering characteristic value; receive a return steering characteristics input indicating a selected return steering characteristic value; receive a road feedback steering characteristics input indicating a selected road feedback steering characteristic value; selectively set a set of steering characteristics using the selected assist steering characteristic value, the selected damping steering characteristic value, the selected return steering characteristic value, and the selected road feedback steering characteristic value; and generate a blended steering mode using the set of steering characteristics.

In some embodiments, an operator provides the assist steering characteristics input, the damping steering characteristics input, the return steering characteristics input, and the road feedback steering characteristics input using a virtual input mechanism provided on a display in communication with a steering system configured to operate according to the blended steering mode. In some embodiments, the display includes a vehicle infotainment interface. In some embodiments, the blended steering mode corresponds to a steering mode having steering characteristic values set between steering characteristic values of a first steering mode set point and steering characteristic values of a second steering mode set point.

The above discussion is meant to be illustrative of the principles and various embodiments of the present disclosure. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present disclosure and do not limit the present disclosure. On the contrary, the disclosure is intended to cover various modifications and equivalent arrangements included within the scope of the appended claims, which scope is to be accorded the broadest interpretation to encompass all such modifications and equivalent structure as is permitted under the law.

Having thus described the invention, it is claimed:

1. A method for providing steering mode control, the method comprising:
 identifying a set of steering characteristic values corresponding to respective steering characteristics for a current steering mode;
 setting the respective steering characteristics to corresponding steering characteristic values of the set of steering characteristic values;
 receiving at least one steering characteristics input indicating a selected steering characteristic value for a corresponding steering characteristic; and
 selectively setting the steering characteristic value of the corresponding steering characteristic to the selected steering characteristic value indicated by the at least one steering characteristics input.

2. The method of claim 1, wherein the at least one steering characteristics input corresponds to a virtual control mechanism corresponding to the corresponding steering characteristic.

3. The method of claim 1, wherein the corresponding steering characteristic includes an assist steering characteristic.

4. The method of claim 1, wherein the corresponding steering characteristic includes a damping steering characteristic.

5. The method of claim 1, wherein the corresponding steering characteristic includes a return steering characteristic.

6. The method of claim 1, wherein the corresponding steering characteristic includes a road feedback steering characteristic.

7. The method of claim 1, further comprising generating a blended steering mode using the selected steering characteristic value indicated by the at least one steering characteristics input.

8. The method of claim 7, wherein the blended steering mode corresponds to a steering mode having steering characteristic values set between steering characteristic values of a first steering mode set point and steering characteristic values of a second steering mode set point.

9. A system for providing steering mode control, the system comprising:
a processor; and
a memory including instructions that, when executed by the processor, cause the processor to:
identify a set of steering characteristic values corresponding to respective steering characteristics for a current steering mode;
set the respective steering characteristics to corresponding steering characteristic values of the set of steering characteristic values;
receive at least one steering characteristics input indicating a selected steering characteristic value for a corresponding steering characteristic; and
selectively set the steering characteristic value of the corresponding steering characteristic to the selected steering characteristic value indicated by the at least one steering characteristics input.

10. The system of claim 9, wherein the at least one steering characteristics input corresponds to a virtual control mechanism corresponding to the corresponding steering characteristic.

11. The system of claim 9, wherein the corresponding steering characteristic includes an assist steering characteristic.

12. The system of claim 9, wherein the corresponding steering characteristic includes a damping steering characteristic.

13. The system of claim 9, wherein the corresponding steering characteristic includes a return steering characteristic.

14. The system of claim 9, wherein the corresponding steering characteristic includes a road feedback steering characteristic.

15. The system of claim 9, wherein the instructions further cause the processor to generate a blended steering mode using the selected steering characteristic value indicated by the at least one steering characteristics input.

16. The system of claim 15, wherein the blended steering mode corresponds to a steering mode having steering characteristic values set between steering characteristic values of a first steering mode set point and steering characteristic values of a second steering mode set point.

17. An apparatus for providing steering mode control, the apparatus comprising:
a processor; and
a memory including instructions that, when executed by the processor, cause the processor to:
receive an assist steering characteristics input indicating a selected assist steering characteristic value;
receive a damping steering characteristics input indicating a selected damping steering characteristic value;
receive a return steering characteristics input indicating a selected return steering characteristic value;
receive a road feedback steering characteristics input indicating a selected road feedback steering characteristic value;
selectively set a set of steering characteristics using the selected assist steering characteristic value, the selected damping steering characteristic value, the selected return steering characteristic value, and the selected road feedback steering characteristic value; and
generate a blended steering mode using the set of steering characteristics.

18. The apparatus of claim 17, wherein an operator provides the assist steering characteristics input, the damping steering characteristics input, the return steering characteristics input, and the road feedback steering characteristics input using a virtual input mechanism provided on a display in communication with a steering system configured to operate according to the blended steering mode.

19. The apparatus of claim 18, wherein the display includes a vehicle infotainment interface.

20. The apparatus of claim 17, wherein the blended steering mode corresponds to a steering mode having steering characteristic values set between steering characteristic values of a first steering mode set point and steering characteristic values of a second steering mode set point.

* * * * *